United States Patent Office 3,647,804
Patented Mar. 7, 1972

3,647,804
CYCLOALKANECARBOXAMIDES
Ronald H. Rynbrandt and Louis L. Skaletzky, Kalamazoo, Mich., assignors to The Upjohn Company, Kalamazoo, Mich.
No Drawing. Continuation-in-part of application Ser. No. 848,089, Aug. 6, 1969. This application Feb. 27, 1970, Ser. No. 15,247
Int. Cl. C07d 29/30
U.S. Cl. 260—293.63  5 Claims

ABSTRACT OF THE DISCLOSURE

Compounds of Formulae XI and XII (both in cis and trans forms)

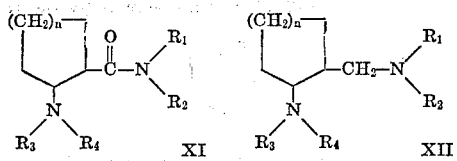

wherein $n$ is a number of 1 to 3, inclusive; $R_1$ is hydrogen, alkyl of 1 to 6 carbon atoms, inclusive, or cycloalkyl of 5 to 7 carbon atoms, inclusive; $R_2$ is alkyl or cycloalkyl defined as above, or together

is a heterocyclic-amino group; and $R_3$ and $R_4$ are alkyl or together

is a heterocyclic-amino group, are prepared. The compounds and the pharmacologically acceptable acid addition salts thereof have various pharmacological activities, e.g., hypoglycemic, sedative, and anti-inflammatory activities and can be used in mammals and birds to produce a lowering of blood sugar, to tranquilize or to reduce inflammatory or arthritic conditions.

This application is a continuation-in-part of application Ser. No. 848,089, filed Aug. 6, 1969.

BACKGROUND OF THE INVENTION

Field of the invention

This invention relates to new organic compounds and is particularly concerned with cycloalkaneaminoamides, cycloalkanediamines, and the pharmacologically acceptable acid addition salts thereof, intermediates therefor, and the processes of production therefor.

SUMMARY OF THE INVENTION

The novel compounds and the processes of invention can be illustratively represented by the following two sequences of formulae:

Method A

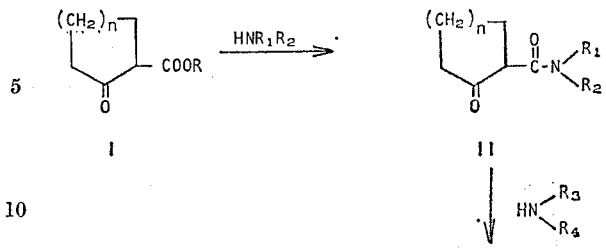

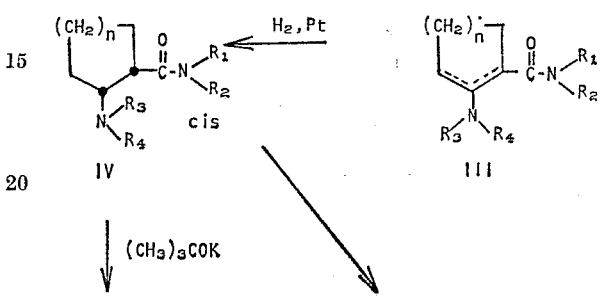

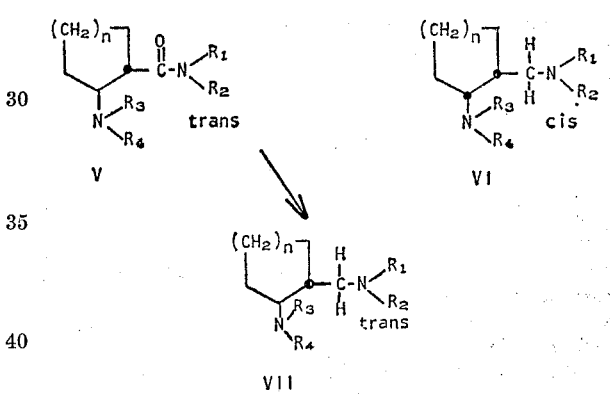

Method B

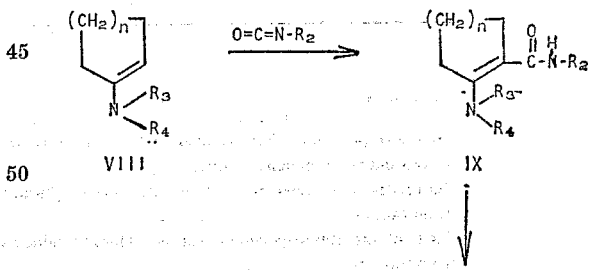

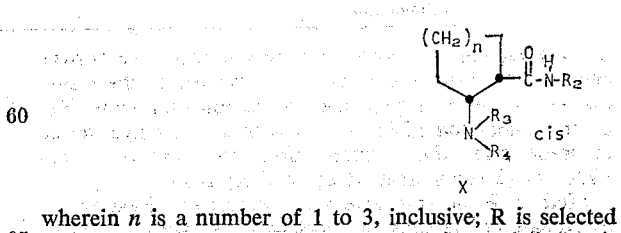

wherein $n$ is a number of 1 to 3, inclusive; R is selected from the group consisting of methyl and ethyl; $R_1$ is selected from the group consisting of hydrogen, alkyl of 1 to 6 carbon atoms, inclusive, and cycloalkyl of 5 to 7 carbon atoms, inclusive; $R_2$ is selected from the group consisting of alkyl and cycloalkyl defined as above, or wherein together

is a heterocyclicamino radical selected from the group consisting of pyrrolidino, piperidino, methyl-substituted piperidino, morpholino, 4-methyl-piperazino and hexamethyleneimino; and wherein $R_3$ and $R_4$ are alkyl, defined as above, or together

is a heterocyclicamino group, defined as above.

The preferred amide compounds (of Formula XI) are those in which $n$ is 2 and therefore have the specific Formula XIa:

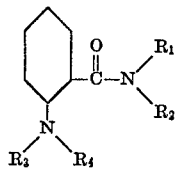

wherein

is selected from the group consisting of dialkylamino in which the alkyl group is of 1 to 6 carbon atoms, inclusive, pyrrolidino, piperidino, methylpiperidino and hexamethyleneimino, and wherein

is selected from the group of pyrrolidino, piperidino and methylpiperidino and hexamethyleneimino.

The method A of this invention comprises: Heating a 2-oxocycloalkanecarboxylic acid ester (I) with an amino compound of the formula $HNR_1R_2$, in which $R_1$ and $R_2$ are defined as above, to obtain the 2-oxocycloalkanecarboxamide (II); treating (II) with an amine $HNR_3R_4$ in which $R_3$ and $R_4$ are defined as above and catalytically hydrogenating the thus-obtained product (III) to obtain the corresponding cis-N-[(2-aminocycloalkyl)carbonyl] amine (IV). Compound (IV) is converted to the trans-isomer (V) by treatment with potassium t-butoxide. Reducing compound (IV) or (V) with a metal hydride or diborane gives the corresponding cis- (VI) or trans- (VII) N-[2-(aminomethyl)cycloalkyl]amine.

Method B of this invention comprises: Heating an isocyanate of the formula O=C=N—$R_2$ with a 1-cyclo-alkeneamine (VIII) to give the unsaturated amide (IX) which by catalytic hydrogenation gives the corresponding cis-N-[(2-aminocycloalkyl)carbonyl]amine (X). The latter (by isomerization with potassium t-butoxide if desired), followed by reduction with a metal hydride or diborane, gives a diamine of Formula XII.

DESCRIPTION OF THE PREFERRED EMBODIMENT

The invention includes the acid addition salts, particularly the pharmacologically acceptable acid addition salts, of compounds XI (cis form compound IV; trans form compound V) and compounds XII (cis form compound VI; trans form VII).

Illustrative acid addition salts include the hydrochlorides, hydrobromides, hydroiodides, sulfates, acetates, propionates, laurates, lactates, tartrates, citrates, maleates, malates, phenylacetates, methanesulfonates, benzenesulfonates, toluenesulfonates, cyclohexanesulfamates and the like.

Illustrative examples of alkyl groups having from 1 to 6 carbon atoms are methyl, ethyl, propyl, isopropyl, butyl, isobutyl, tertiary butyl, pentyl, 2-methylbutyl, neopentyl, hexyl, 2-methylpentyl, 3-methylpentyl and the like.

Examples of the cycloalkyl radical of 5 to 7 carbon atoms, inclusive, illustratively represented by the formula

are cyclopentyl, cyclohexyl and cycloheptyl.

The novel compounds of Formula XII have hypoglycemic activity and can be used to lower the blood sugar level in mammals and birds by oral administration. The same applies to a number of the compounds of Formula XI.

The following test procedure was carried out to show the depression of blood sugar in rats: Intact male rats were fasted from 18 to 24 hours, and an oral dose of the new compound to be tested (here 25 and 100 mg.kg.) was administered in 0.5 ml. of a vehicle containing in each milliliter 5 mg. carboxymethylcellulose, 4 mg. polysorbate 80, 9 mg. sodium chloride and 9 mg. benzyl alcohol, the balance being water. Each rat was then injected subcutaneously with 125 mg. of glucose in 0.9% saline. The rats were bled two hours later via vena cava and the blood sugar determined. The control rats were fed the above vehicle without the drug. The average change of blood sugar in percent between the control animal and the test animal is reported in Table I.

TABLE 1.—ORAL ANTIDIABETIC ACTIVITY

| Compound | Dosage. mg./kg. | Change of blood sugar from control, percent (test compound) |
|---|---|---|
| Cis-1-[2-(piperdinomethyl)cyclohexyl]piperidine dihydrochloride | 25 | −36 |
|  | 100 | −59 |
| Tolbutamide (trademark "Orinase") | 25 | −39.7 |
| Cis-1-[2-(hexamethyleneiminocyclohexyl)carbonyl]hexamethyleneimine hydrochloride | 25 | −26 |
|  | 100 | −44 |
| Tolbutamide | 25 | −29.8 |
| Cis-N-[2-(piperidinocyclohexyl)carbonyl]diethylamine hydrochloride | 25 | −18.4 |
|  | 100 | −49.3 |
| Tolbutamide | 25 | −32.8 |
| Cis-1-[2-[(cyclohexylamino)methyl]cyclohexyl]piperidine dihydrochloride | 25 | −21.7 |
|  | 100 | −51.4 |
| Tolbutamide | 25 | −28.8 |

Other Formula XI compounds having hypoglycemic activity include cis-1-[(2-piperidinocyclohexyl)carbonyl] piperidine free base (activity of 0.6 relative to tolbutamide) and hydrochloride (0.5 x tolbutamide); cis-1-[[2 - (1-pyrrolidinyl)cyclohexyl]carbonyl]piperidine hydrochloride (0.5 x tolbutamide); cis - 4 - [(2-piperidinocyclohexyl)carbonyl]morpholine hydrochloride (0.25 x tolbutamide); and cis - 1 - [[2-(1-pyrrolidinyl)cyclohexyl]carbonyl]pyrrolidine free base (0.27 x tolbutamide) and the hydrochloride (0.25 x tolbutamide).

A unit dosage of 5-100 mg./kg., taken 2 to 4 times daily, is used to lower blood sugar.

A number of the compounds of Formula XI also have oral anti-inflammatory activity and are thus useful in the treatment of inflammatory, e.g., arthritic conditions, of mammals and birds at a dosage approximately equal to that of aspirin. The anti-inflammatory actvity was measured by the hind paw assay in which one hind paw of each test and control rat is injected with a phlogistic agent (carrageen), the test rat after having been primed with the test anti-inflammatory agent. The weight of the amputated right and left hind paws are used to calculate the relative suppression of inflammation [see details by M. E. Glenn et al., J. Pharm. Exptl. Therapeutics, 155, 157 (1967)].

Table II below gives the anti-inflammatory activity relative to aspirin.

TABLE II

| | Anti-inflammatory activity (x aspirin) |
|---|---|
| Aspirin | 1.0 |
| Cis - 1 - [[2 - (1-pyrrolidinyl)cyclohexyl]carbonyl]pyrrolidine hydrochloride | 0.9 |
| Cis - 4 - [(2 - morpholinocyclohexyl)-carbonyl]morpholine | 1.5 |
| Cis - 4 - [(2 - morpholinocyclohexyl)-carbonyl]morpholine hydrochloride | 1.6 |
| Cis - 1 - [(2 - piperidinocyclopentyl)carbonyl]piperidine | 1.0 |
| Cis - 4 - [(2 - piperidinocyclohexyl)-carbonyl)morpholine | 1.0 |
| Cis - 4 - [(2 - piperidinocyclohexyl)-carbonyl]morpholine hydrochloride | 1.8 |
| Cis - 4 - [[2 - (1-pyrrolidinyl)cyclohexyl]carbonyl]morpholine | 1.2 |
| Cis - 4 - [[2 - (1-pyrrolidinyl)cyclohexyl]carbonyl]morpholine hydrochloride | 0.92 |

Cis - 1 - [(2 - morpholinocyclohexyl)carbonyl]piperidine hydrochloride shows anticonvulsive, tranquilizing and sedative activities at 100-200 mg./kg. body weight in mice as evidenced by the chimney, dish and pedestal tests and nicotine antagonism.

For oral administration the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions wherein edible oils, e.g., corn, oil, cottonseed oil, coconut oil, peanut oil, sesame oil, or mixtures of these, and the like can be employed.

For preparing compositions such as tablets and other compressed formulations the compositions can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resortable hard gelatin or soft capsules utilizing conventional pharmaceutical practices.

As noted above, the new compounds, of Formulae XI and XII can be used in the form of pharmacologically acceptable acid addition salts with inorganic or organic acids, for example, as hydrochlorides, hydrobromides, sulfates, hydroiodies, phosphates, citrates, lactates, tartrates, salicylates, cyclohexanesulfamates, pamoates, and the like. The acid addition salts can be prepared in conventional manner, for example by reacting the selected acid with the selected free amine of Formula XI or XII preferably in an aqueous or non-aqueous solvent such as water, ether, methanol, ethanol, ethyl acetate or the like. Evaporation of the solvent provides the desired acid addition salt.

The novel compounds are also useful on account of their utility in the non-pharmaceutical field. For example, the fluosilicates of compounds of Formulae XI or XII are useful as mothproofing agents. The thiocyanates of the same compounds can be condensed with formaldehyde to form resinous polymers which are useful as pickling inhibitors. The trichloroacetates of the same compounds are useful as herbicides, for example, against Johnson grass, yellow foxtail, green foxtail, Bermuda grass and quack grass.

In carrying out the process of this invention by the Method A, a lower alkyl ester of a 2-oxocycloalkanecarboxylic acid (I) is heated with an equimolar amount of an amine of formula $HNR_1R_2$. If this amine is a gas or low boiling liquid, the reaction is carried out in an inert organic agent such as benzene, toluene, carbon tetrachloride, tetrahydrofuran or the like. The reaction time is between 1 to 48 hours and the reaction is usually carried out at about the reflux temperature of the mixture. After termination of the reaction, the thus obtained 2-oxocycloalkanecarboxamide (II) is separated and purified by conventional procedures such as by distillation in vacuo, recrystallization, chromatography or the like.

The thus obtained 2-oxocycloalkanecarboxamide (II) is thereupon reacted with a selected secondary amine $HNR_3R_4$ 

in benzene solution in the presence of an acid catalyst, preferably p-toluenesulfonic acid. In this reaction water separates and provision should be made for the separation of water from the reaction mixture, e.g., an azeotropic separator, or substances capable of absorbing water such as calcium sulfate, magnesium silicate and other anhydrous inorganic salts capable of forming hydrates. The reaction time is usually between 1 and 48 hours at the reflux temperature of the mixture. Inert solvents such as toluene, benzene, tetrahydrofuran, ether as well as methyl alcohol (anhydrous) can be used. At the end of the reaction the resulting enamine (III) is isolated only in the crude stage by removing excess amine and solvent, generally by distillation in vacuo.

The thus-obtained crude material is then catalytically hydrogenated in the presence of a platinum catalyst and an inert solvent, e.g., ethanol, methanol or the like. In the preferred embodiment of this reaction, platinum oxide reduced at a hydrogen pressure of 10-80 pounds is used. The platinum oxide is used in a ratio of 1 part by weight of $PtO_2$ to 200-1000 parts by weight of the reaction mixture. The hydrogenation is generally carried out for 6 to 72 hours whereafter the reaction mixture is filtered to remove the catalyst and evaporated to give the desired product, a cis - N - [(2-aminocycloalkyl)carbonyl]amine (IV), which can be purified in conventional manner such as crystallization, chromatography or the like.

This cis compound of Formula IV can be converted to the corresponding trans compound (V) by heating and refluxing a mixture of potassium tert.-butoxide in tert.-butyl alcohol with the selected cis compound (IV). In the preferred embodiment of this invention, compound IV is heated with 1 to ½₀ of a mole of potassium tert.-butoxide per mole of compound IV in tert.-butyl alcohol for a period of 6 to 48 hours. After the reaction is terminated, the mixture is cooled, diluted with excess water and the resulting product extracted with a water-immiscible organic solvent such as methylene chloride, chloroform, carbon tetrachloride, ether or the like. Evaporation of the extract and recrystallization of the resulting residue provides the isomeric trans compound of Formula V.

The amides of Formulae IV and V are converted to the diamines of Formulae VI and VII, respectively, by reduction with a metal hydride or diborane. Metal hydrides useful for this reduction include lithium aluminum hydride, aluminum hydride and magnesium aluminum hydride, with lithium aluminum hydride preferred. The reduction is carried out in conventional manner, usually by adding the compound of Formula IV and V in solution to a suspension of the metal hydride or a solution of diborane. Inert solvents for this reaction include dioxane, tetrahydrofuran, ether, dibutyl ether, benzene or the like. The same solvents may be used to keep the lithium aluminum hydride in suspension. Diborane is usually used in tetrahydrofuran solution. After the addition of the compound of Formula IV or V is completed, the mixture is generally kept at reflux for 1 to 24 hours, then cooled and decomposed with water, thereafter with aqueous sodium or potassium hydroxide or the like when employing lithium aluminum hydride; or decomposed with hydrochloric acid when employing diborane. After filtration of the mixture and evaporation of the solvent, the product is obtained in its crude form which can be purified by standard procedures such as recrystallization, chromatography, or the like. The thus-obtained diamines of Formulae VI and VII can be converted into salts by the addition of an acid in stoichiometric proportions, in an aqueous or non-aqueous medium as noted above.

In carrying out the process of this invention according to Method B, an isocyanate of the Formula $O=C=N-R_2$ in which $R_2$ is defined as before, in an organic solvent, is added to a 1-cycloalkeneamine of Formula VIII. In the preferred embodiment of this reaction the isocyanate is added in solution such as benzene, toluene, ether or the like to the enamine (VIII) also in solution, under conditions of reflux. After all of the isocyanate solution has been added, the mixture is refluxed from 6 to 48 hours, the solvent is removed by distillation and the resulting residue is dissolved in benzene or ethanol and hydrogenated catalytically to provide a compound of Formula X, i.e., a compound of Formula IV in which $R_1$ is hydrogen. The product thus obtained can be isolated and purified as shown before. A transform of this product can be made by treatment with potassium tert.-butoxide to give a compound of Formula V in which $R_1$ is hydrogen. Each of the compounds of Formulae IV and V in which $R_1$ is hydrogen can be converted to the corresponding diamine (VI and VII) by reduction with a metal hydride or diborane as discussed before.

The following examples are illustrative of the process and the products of the present invention, but are not to be construed as limiting.

EXAMPLE 1

1-[(2-oxocyclohexyl)carbonyl]piperidine

A mixture of ethyl and methyl 2-oxocyclohexanecarboxylates (85 g.; about 0.50 mole) and piperidine (43 g.; 0.50 mole) was heated at reflux for 17.5 hours. After cooling, the low boiling constituents were removed on a rotary evaporator and the residue was vacuum distilled to afford:

| | Boiling point | Weight, grams |
|---|---|---|
| Fraction: | | |
| I | 60–65° C./0.05 mm. | 31. |
| II | 128–130° C./0.05 mm. | 52 (50% yield). |

Fraction II, the desired product, solidified shortly after distillation. This crude product was recrystallized from ethyl ether to give pure 1-[(2-oxocyclohexyl)carbonyl]piperidine of melting point 64.5–66.5° C.

*Analysis.*—Calcd. for $C_{12}H_{19}NO_2$ (percent): C, 68.86; H, 9.15; N, 6.69. Found (percent): C, 68.42; H, 9.09; N, 6.71.

EXAMPLE 2

Cis-1-[(2-piperidinocyclohexyl)carbonyl]piperidine and its hydrochloride

A mixture of 1-[(2-oxocyclohexyl)carbonyl]piperidine (16 g.; 0.075 mole), piperidine (20 g.), benzene (125 ml.), and p-toluenesulfonic acid (0.5 g.) was refluxed for 22 hours using an azeotropic separator. The solvent and excess piperidine were removed on a rotary evaporator. The residue was dissolved in 200 ml. of absolute ethanol and hydrogenated for 48 hours in the presence of platinum catalyst (0.5 g. $PtO_2$) at an initial pressure of 50 p.s.i. The catalyst was removed by filtration and the solvent was removed on a rotary evaporator. The residue was dissolved in 0.5 l. of ether, washed with two 75-ml. portions of water and dried over anhydrous magnesium sulfate. The solvent was removed on a rotary evaporator and the residue was recrystallized from hexane to give 13.8 g. (66%) of cis-1-[(2-piperidinocyclohexyl)carbonyl]piperidine of melting point 84.5–86.5° C.

*Analysis.*—Calcd. for $C_{17}H_{30}N_2O$ (percent): C, 73.30; H, 10.89; N, 10.06. Found (percent): C, 72.98; H, 10.85; N, 10.04.

Cis-1-[(2-piperidinocyclohexyl)carbonyl]piperidine hydrochloride was prepared by treating an ether solution of the free base with ethereal hydrogen chloride and was recrystallized from ethanol-ether; melting point 220–221° C.

*Analysis.*—Calcd. for $C_{17}H_{30}N_2O \cdot HCl$ (percent): C, 64.80; H, 9.94; N, 8.90; Cl, 11.28. Found (percent): C, 64.80; H, 10.01; N, 8.69; Cl, 11.14.

EXAMPLE 3

Cis-1-[(2-morpholinocyclohexyl)carbonyl]piperidine hydrochloride

A mixture of 10.45 g. (0.050 mole) of 1-[(2-oxocyclohexyl)carbonyl]piperidine, 4.35 g. (0.050 mole) of morpholine, 125 ml. of benzene and 0.5 g. of p-toluenesulfonic acid was refluxed for 4 days using an azeotropic separator. The solvent was removed on a rotary evaporator and the residue was dissolved in absolute ethanol (200 ml.) and hydrogenated in the presence of platinum catalyst (0.5 g. $PtO_2$) at an initial pressure of 50 p.s.i. The catalyst was removed by filtration and the solvent was removed on a rotary evaporator. The residue was dissolved in ether (0.5 l.), washed with water (two 50-ml. portions), and dried over anhydrous magnesium sulfate. The solvent was removed on a rotary evaporator and the residue was converted into the hydrochloride in ether solution with ethereal hydrogen chloride and recrystallized from ethanol-ether to give 8.6 g. (54%) of cis-1-[(2-morpholinocyclohexyl)carbonyl]piperidine hydrochloride of melting point 195–196° C.

*Analysis.*—Calcd. for $C_{16}H_{28}N_2O_2 \cdot HCl$ (percent): C, 60.63; H, 9.22; N, 8.84; Cl, 11.21. Found (percent): C, 60.64; H, 8.90; N, 8.55; Cl, 11.18.

EXAMPLE 4

Cis-1-[[2-(1-pyrrolidinyl)cyclohexyl]carbonyl]-piperidine hydrochloride

A mixture of 10.45 g. (0.050 mole) of 1-[(2-oxocyclohexyl)carbonyl]piperidine, pyrrolidine (3.55 g.; 0.050 mole), benzene (125 ml.), and p-toluenesulfonic acid (0.5 g.) was refluxed for 10 hours using an azeotropic separator. The solvent and excess pyrrolidine were removed on a rotary evaporator and the residue was dissolved in absolute ethanol (200 ml.) and hydrogenated for 20 hours in the presence of platinum catalyst (0.5 g. $PtO_2$) at an initial pressure of 50 p.s.i. The catalyst was removed by filtration and the solvent was removed on a rotary evaporator. The resulting residue was dissolved in ether (0.5 l.), washed with water (two 50-ml. portions), and dried over anhydrous magnesium sulfate. The solvent was removed on a rotary evaporator and the residue was converted into the hydrochloride in ether with ethereal hydrogen chloride and recrystallized from ethanol-ether to give 7.8 g. (51%) of cis-1-[[2-(1-pyrrolidinyl)cyclohexyl]carbonyl]piperidine hydrochloride of melting point 192–193.5° C.

*Analysis.*—Calcd. for $C_{16}H_{28}N_2O \cdot HCl$ (percent): C, 63.85; H, 9.71; N, 9.31; Cl, 11.81. Found (percent): C, 63.96; H, 9.88; N, 9.05; Cl, 11.80.

EXAMPLE 5

4-[(2-oxocyclohexy)carbonyl]morpholine

A mixture of ethyl and methyl 2-oxocyclohexanecarboxylates (85 g.; about 0.50 mole) and morpholine (43.5 g.; 0.50 mole) was heated at reflux for 23 hours. After cooling, the lower boiling constituents were removed on a rotary evaporator and the residue was vacuum distilled to afford:

| Fraction: | Boiling point | Weight, grams |
|---|---|---|
| I | 70–75° C./0.05 mm. | 30. |
| II | 145–150° C./0.05 mm. | 50 (48% yield). |

Fraction II, the desired product, solidified shortly after distillation and was recrystallized from ether to give 4 - [(2 - oxocyclohexyl)carbonyl]morpholine of melting point 79.5–81° C.

Analysis.—Calcd. for $C_{11}H_{17}NO_3$ (percent): C, 62.50; H, 8.14; N, 6.63. Found (percent): C, 62.33; H, 8.15; N, 6.56.

EXAMPLE 6

Cis-4-[(2-morpholinocyclohexy)carbonyl]morpholine and its hydrochloride

A mixture of 10.5 g. (0.050 mole) of 4-[(2-oxocyclohexyl)carbonyl]morpholine, 4.35 g. (0.050 mole) of morpholine, benzene (150 ml.), and p-toluenesulfonic acid (0.5 g.) was refluxed for 26 hours using an azeotropic separator. The solvent was removed on a rotary evaporator and the residue was dissolved in ethanol (200 ml.) and hydrogenated for 44 hours in the presence of platinum catalyst (0.5 g. $PtO_2$) at an initial pressure of 50 p.s.i. The catalyst was removed by filtration and the solvent was removed on a rotary evaporator. The residue was dissolved in ether (0.5 l.), washed with water (two 75-ml. portions), and dried over anhydrous magnesium sulfate. The solvent was removed on a rotary evaporator and the residue was recrystallized from ether to afford 4.0 g. (29%) of cis-4-[(2-morpholinocyclohexyl)carbonyl]morpholine of melting point 97.5–98.5° C.

Analysis.—Calcd. for $C_{15}H_{26}N_2O_3$ (percent): C, 63.76; H, 9.32; N, 9.92. Found (percent): C, 63.40; H, 9.02; N, 10.12.

Cis - 4-[2 - morpholinocyclohexy)carbonyl]morpholine hydrochloride was prepared by treating an ether solution of the free base with ethereal hydrogen chloride and was recrystallized from ethanol-ether; melting point 226–228° C.

Analysis.—Calcd. for $C_{15}H_{26}N_2O_3 \cdot HCl$ (percent): C, 56.46; H, 8.56; N, 8.78; Cl, 11.14. Found (percent): C, 56.42; H, 8.31; N, 8.85; Cl, 11.39.

EXAMPLE 7

Cis-4-[[2-(1-pyrrolidinyl)cyclohexyl]carbonyl]-morpholine and its hydrochloride A mixture of 10.5 g. (0.050 mole) of 4-[(2-oxocyclohexyl)carbonyl]morpholine, pyrrolidine (3.55 g.; 0.050 mole), benzene (150 ml.), and p-toluenesulfonic acid (0.5 g.) was refluxed for 24 hours using an azeotropic separator. The solvent was removed on a rotary evaporator and the residue was dissolved in ethanol (200 ml.) and hydrogenated for 20 hours in the presence of platinum catalyst (0.5 g. $PtO_2$) at an initial pressure of 50 p.s.i. The catalyst was removed by filtration and the solvent was removed on a rotary evaporator. The residue was dissolved in ether (0.5 l.), washed with water (two 75-ml. portions), and dried over anhydrous magnesium sulfate. The solvent was removed on a rotary evaporator and the residue was recrystallized from ether and then from hexane to give 6.3 g. (47%) of cis-4-[[2-(1-pyrrolidinyl)cyclohexyl]carbonyl]morpholine of melting point 66.5–68° C.

Analysis.—Calcd. for $C_{15}H_{26}N_2O_2$ (percent): C, 67.59; H, 9.88; N, 10.51. Found (percent): C, 67.64; H, 9.94; N, 10.51.

Cis - 4 - [[2 - (1-pyrrolidinyl)cyclohexyl]carbonyl]-morpholine hydrochloride was prepared by treating an ether solution of the free base with ethereal hydrogen chloride and was recrystallized from ethanol-ether; melting point 215–216.5° C.

Analysis.—Calcd. for $C_{15}H_{26}N_2O_2 \cdot HCl$ (percent): C, 59.45; H, 9.02; N, 9.25; Cl, 11.72. Found (percent): C, 59.73; H, 9.13; N, 9.15; Cl, 11.67.

EXAMPLE 8

Cis-4-[(2-piperidinocyclohexyl)carbonyl]morpholine and its hydrochloride

A mixture of 10.5 g. (0.050 mole) of 4-[(2-oxocyclohexyl)carbonyl]morpholine, piperidine (4.25 g.; 0.050 mole), benzene (150 ml.), and p-toluenesulfonic acid (0.5 g.) was refluxed for 24 hours using an azeotropic separator. The solvent and excess piperidine were removed on a rotary evaporator and the residue was dissolved in ethanol (200 ml.) and hydrogenated for 44 hours in the presence of platinum catalyst (0.5 g. $PtO_2$) at an initial pressure of 50 p.s.i. The catalyst was removed by filtration and the solvent was removed on a rotary evaporator. The residue was dissolved in ether (0.5 l.), washed with water (two 75-ml. portions), and dried over anhydrous magnesium sulfate. The solvent was removed on a rotary evaporator and the residue was recrystallized from absolute ether to afford 7.5 g. (54%) of cis-4-[(2-piperidinocyclohexyl)carbonyl]morpholine of melting point 101–102.5° C.

Analysis.—Calcd. for $C_{16}H_{28}N_2O_2$ (percent): C, 68.49; H, 10.09; N, 9.99. Found (percent): C, 68.56; H, 9.99; N, 10.10.

Cis-4-[(2 - piperdinocyclohexyl)carbonyl]morpholine hydrochloride was prepared by treating an ether solution of the free base with ethereal hydrogren chloride and was recrystallized from ethanol-ether; melting point 211–213° C.

Analysis.—Calcd. for $C_{16}H_{28}N_2O_2 \cdot HCl$ (percent): C, 60.61; H, 9.25; N, 8.84; Cl, 11.21. Found (percent): C, 60.36; H, 9.41; N, 8.73; Cl, 11.10.

EXAMPLE 9

1-[(2-oxocylohexyl)carbonyl]hexamethyleneimine

A mixture of ethyl and methyl 2-oxocyclohexanecarboxylates (85 g.; about 0.50 mole) and hexamethyleneimine (50 g.; 0.50 mole) was refluxed for 23 hours. The lower boiling components were removed on a rotary evaporator and the residue was vacuum distilled to give:

| Fraction: | Boiling point | Weight, grams |
|---|---|---|
| I | 60–78° C./0.05 mm. | 30. |
| II | 139–141° C./0.05 mm. | 78 (71% yield). |

Fraction II, the desired product, solidified shortly after distillation and was recrystallized from hexane to give 1 - [(2 - oxocyclohexyl)carbonyl]hexamethyleneimine of melting point 56–58° C.

Analysis.—Calcd. for $C_{13}H_{21}NO_2$ (percent): C, 69.92; H, 9.46; N, 6.28. Found (percent): C, 70.24; H, 9.39; N, 6.02.

EXAMPLE 10

Cis-1-[(2-hexamethyleneiminocyclohexyl)carbonyl]-hexamethyleneimine hydrochloride A mixture of 11.15 g. (0.050 mole) of 1-[(2-oxocyclohexyl)carbonyl]hexamethyleneimine, hexamethyleneimine (10 g.; 0.10 mole), toluene (150 ml.), and p-toluenesulfonic acid (0.5 g.) was refluxed for 3 hours using an azeotropic separator. The solvent and excess hexamethyleneimine were removed on a rotary evaporator and the residue was dissolved in absolute ethanol (200 ml.) and hydrogenated for 18 hours in the presence of platinum catalyst (0.5 g. $PtO_2$) at an initial pressure of 50 p.s.i. The catalyst was removed by filtration and the solvent was removed on a rotary evaporator. The residue was converted into the hydrochloride in ether with ethereal hydrogen chloride and recrystallized from ethanol-ether to afford 8.1 g. (48% yield) of cis-1-[(2-hexamethyleneiminocyclohexyl)carbonyl]hexamethyleneimine hydrochloride of melting point 191–192.5° C.

*Analysis.*—Calcd. for $C_{19}H_{34}N_2O \cdot HCl$ (percent): C, 66.51; H, 10.30; N, 8.17; Cl, 10.36. Found (percent): C, 66.05; H, 10.33; N, 8.11; Cl, 10.47.

EXAMPLE 11

1-[(2-oxocyclohexyl)carbonyl]pyrrolidine

A mixture of ethyl and methyl 2-oxocyclohexanecarboxylates (37.5 g.; about 0.22 mole) and pyrrolidine (15.5 g.; 0.22 mole) was heated at reflux for 40 hours. The lower boiling constituents were removed on a rotary evaporator and the residue was vacuum distilled to give:

| Fraction: | Boiling point | Weight, grams |
|---|---|---|
| I | 65–70° C./0.05 mm. | 15. |
| II | 125–130° C./0.05 mm. | 29 (58% yield). |

Fraction II solidified shortly after distillation and was recrystallized from ether to give 1-[(2-oxocyclohexyl)carbonyl]pyrrolidine of melting point 89–90.5° C.

*Analysis.*—Calcd. for $C_{11}H_{17}NO_2$ (percent): C, 67.72; H, 8.81; N, 7.17. Found (percent): C, 67.87; H, 8.72; N, 7.38.

EXAMPLE 12

Cis-1-[[2-(1-pyrrolidinyl)cyclohexyl]carbonyl] pyrrolidine and its hydrochloride A mixture of 9.75 g. (0.050 mole) of 1-[(2-oxocyclohexyl)carbonyl]pyrrolidine, pyrrolidine (3.55 g.; 0.050 mole) benzene (150 ml.), and p-toluenesulfonic acid (0.5 g.) was refluxed for 24 hours using an azeotropic separator. The solvent and excess pyrrolidine were removed on a rotary evaporator and the residue was dissolved in ethanol (200 ml.) and hydrogenated for 20 hours in the presence of platinum catalyst (0.5 g. $PtO_2$) at an initial pressure of 50 p.s.i. The catalyst was removed by filtration and the solvent was removed on a rotary evaporator. The residue was dissolved in ether (0.5 l.), washed with water (two 75-ml. portions), and dried over anhydrous magnesium sulfate. The solvent was removed on a rotary evaporator and the residue was recrystallized from hexane to give 5.9 g. (47%) of cis-1-[[2-(1-pyrrolidinyl)cyclohexyl]carbonyl]pyrrolidine of melting point 72.5–73.5° C.

*Analysis.*—Calcd. for $C_{15}H_{26}N_2O$ (percent): C, 71.91; H, 10.51; N, 11.19. Found (percent): C, 72.16; H, 10.50; N, 11.43.

Cis - 1 - [[2-(1-pyrrolidinyl)cyclohexyl]carbonyl]pyrrolidine hydrochloride was prepared from the free base in ether with ethereal hydrogen chloride and was recrystallized from ethanol-ether; melting point 223.5–225° C.

*Analysis.*—Calcd. for $C_{15}H_{26}N_2O \cdot HCl$ (percent): C, 62.76; H, 9.52; N, 9.76; Cl, 12.38. Found (percent): C, 63.17; H, 9.51; N, 9.86; Cl, 12.32.

EXAMPLE 13

N-[(2-oxocyclohexyl)carbonyl]diethylamine

A mixture of ethyl and methyl 2-oxocyclohexanecarboxylates (85 g.; about 0.50 mole) and diethylamine (37 g.; 0.50 mole) was refluxed for 14 days. The lower boiling constituents were removed on a rotary evaporator and the residue was vacuum distilled to afford:

| Fraction: | Boiling point | Weight, grams |
|---|---|---|
| I | 60–70° C./0.05 mm. | 65. |
| II | 98–101° C./0.05 mm. | 34 (33% yield). |

Fraction II, the desired N-[(2-oxocyclohexyl)carbonyl] diethylamine, had the following analysis.

*Analysis.*—Calcd. for $C_{11}H_{19}NO_2$ (percent): C, 67.02; H, 9.69; N, 7.10. Found (percent): C, 67.24; H, 9.90; N, 7.02.

EXAMPLE 14

Cis-N-[(2-piperidinocyclohexyl)carbonyl]diethylamine hydrochloride

A mixture of 9.85 g. (0.050 mole) of N-[(2-oxocyclohexyl)-carbonyl]diethylamine, piperidine (5.1 g.; 0.060 mole), benzene (150 ml.), and p-toluenesulfonic acid (0.5 g.) was refluxed for 3 days using an azeotropic separator. The solvent and excess piperidine were removed on a rotary evaporator and the residue was dissolved in absolute ethanol (200 ml.) and hydrogenated for 18 hours in the presence of platinum catalyst (0.5 g. $PtO_2$) at an initial pressure of 50 p.s.i. The catalyst was removed by filtration and the solvent was removed on a rotary evaporator. The residue was dissolved in ether (300 ml.) and extracted with dilute hydrochloric acid (two 125-ml. portions). The combined extracts were made basic with sodium hydroxide solution and extracted with ether (two 200-ml. portions). The combined extracts were washed with water (two 50-ml. portions) and dried over anhydrous magnesium sulfate. The solvent was removed on a rotary evaporator and the residue was converted into the hydrochloride in ether with ethereal hydrogen chloride and recrystallized once from ethanol-ether and twice from carbon tetrachloride to give 4.7 g. (46%) of cis-N-[(2-piperidinocyclohexyl)-carbonyl]diethylamine hydrochloride of melting point 191–193° C.

*Analysis.*—Calcd. for $C_{16}H_{30}N_2O \cdot HCl$ (percent): C, 63.43; H, 10.31; N, 9.25; Cl, 11.73. Found (percent): C, 63.57; H, 10.34; N, 9.27; Cl, 12.25.

EXAMPLE 15

1-[(2-oxocyclopentyl)carbonyl]piperidine

A mixture of ethyl and methyl 2-oxocyclopentanecarboxylates (31.2 g.; about 0.20 mole) and piperidine (18.7 g.; 0.22 mole) was heated at reflux for 72 hours. The lower boiling components were removed on a rotary evaporator and the residue was vacuum distilled to afford:

| Fraction: | Boiling point | Weight, grams |
|---|---|---|
| I | 60–120° C./0.05 mm. | 3.1. |
| II | 124–126° C./0.05 mm. | 21 (54% yield). |

Fraction II was 1 - [(2 - oxocyclopentyl)carbonyl] piperidine.

*Analysis.*—Calcd. for $C_{11}H_{17}NO_2$ (percent): C, 67.62; H, 8.81; N, 7.17. Found (percent): C, 67.79; H, 8.74; N, 6.98.

EXAMPLE 16

Cis-1-[(2-piperidinocyclopentyl)carbonyl]piperidine

A mixture of 9.76 g. (0.05 mole) of 1-[(2-oxocyclopentyl)-carbonyl]piperidine, piperidine (16 g.; 0.20 mole), benzene (125 ml.), and p-toluenesulfonic acid (0.5 g.) was refluxed for 5 hours using an azeotropic separator. The solvent and excess piperidine were removed on a rotary evaporator and the residue was dissolved in absolute ethanol (200 ml.) and hydrogenated for 2 hours in the presence of platinum catalyst (0.5 g. $PtO_2$) at an initial pressure of 50 p.s.i. The catalyst was removed by filtration and the solvent was removed on a rotary evaporator. The residue was dissolved in ether (400 ml.), washed with water (50 ml.), and dried over anhydrous magnesium sulfate. The solvent was removed on a rotary evaporator and the residue was recrystallized from hexane to afford 8.2 g. (62%) of cis-1-[(2-piperidinocyclopentyl) carbonyl]piperidine of melting point 86–87.5° C.

Analysis.—Calcd. for $C_{16}H_{28}N_2O$ (percent): C, 72.64; H, 10.71; N, 10.59. Found (percent): C, 72.35; H, 10.94; N, 10.64.

EXAMPLE 17

1-[(2-oxocycloheptyl)carbonyl]piperidine

In the manner given in Example 1, a mixture of ethyl 2-oxocycloheptanecarboxylate and piperidine was heated to reflux to give 1-[(2-oxocycloheptyl)carbonyl]piperidine.

EXAMPLE 18

Cis-1-[(2-piperidinocycloheptyl)carbonyl]piperidine

In the manner given in Example 2, 1-[(2-oxocycloheptyl)carbonyl]piperidine was reacted with piperidine in the presence of p-toluenesulfonic acid and the resulting enamine was catalytically hydrogenated ($PtO_2$ and hydrogen) to give cis - 1-[(2-piperidinocycloheptyl)carbonyl]piperidine.

EXAMPLE 19

1-[(2-oxocycloheptyl)carbonyl]hexamethyleneimine

In the manner given in Example 1, a mixture of ethyl 2-oxocycloheptanecarboxylate and hexamethyleneimine was heated to reflux to give 1-[(2-oxocycloheptyl)carbonyl]hexamethyleneimine.

EXAMPLE 20

Cis-1-[(2-morpholinocycloheptyl)carbonyl]hexamethyleneimine

In the manner given in Example 2, 1-[(2-oxocycloheptyl)carbonyl]hexamethyleneimine was reacted with morpholine in the presence of p-toluenesulfonic acid and the resulting enamine was hydrogenated in the presence of a platinum catalyst to give cis-1-[(2-morpholinocycloheptyl)carbonyl]hexamethyleneimine.

EXAMPLE 21

1-[(2-oxocycloheptyl)carbonyl]-4-methylpiperazine

In the manner given in Example 1, a mixture of ethyl 2-oxocycloheptanecarboxylate and N-methylpiperazine was heated to reflux to give 1-[(2-oxocycloheptyl)carbonyl]-4-methylpiperazine.

EXAMPLE 22

Cis-1-[(2-morpholinocycloheptyl)carbonyl]-4-methylpiperazine

In the manner given in Example 2, 1-[(2-oxocycloheptyl)carbonyl]-4-methylpiperazine was reacted with morpholine in the presence of p-toluenesulfonic acid and the resulting enamine was hydrogenated in the presence of a platinum catalyst to give cis-1-[(2-morpholinocycloheptyl)carbonyl]-4-methylpiperazine.

EXAMPLE 23

1-[(2-oxocyclohexyl)carbonyl]-3-methylpiperidine

In the manner given in Example 1, a mixture of ethyl 2-oxocyclohexanecarboxylate and 3-methylpiperidine was heated to reflux to give 1-[(2-oxocyclohexyl)carbonyl]-3-methylpiperidine.

EXAMPLE 24

Cis-1-[[2-(2-methylpiperidino)cyclohexyl]carbonyl]-3-methylpiperidine

In the manner given in Example 2, 1-[(2-oxocyclohexyl)carbonyl]-3-methylpiperidine was reacted with 2-methylpiperidine in the presence of p-toluenesulfonic acid and the resulting enamine was hydrogenated in the presence of a platinum catalyst to give cis-1-[[2-(2-methylpiperidino)cyclohexyl]carbonyl]-3-methylpiperidine.

EXAMPLE 25

1-[(2-oxocyclopentyl)carbonyl]hexamethyleneimine

In the manner given in Example 1, a mixture of ethyl 2-oxocyclopentanecarboxylate and hexamethyleneimine was heated to reflux to give 1-[(2-oxocyclopentyl)carbonyl]hexamethyleneimine.

EXAMPLE 26

Cis-1-[(2-dimethylaminocyclopentyl)carbonyl]-hexamethyleneimine

In the manner given in Example 2, 1-[(2-oxocyclopentyl)carbonyl]hexamethyleneimine was reacted with dimethylamine in benzene in the presence of p-toluenesulfonic acid and the resulting enamine was hydrogenated in the presence of a platinum catalyst to give cis-1-[(2-dimethylaminocyclopentyl)carbonyl]hexamethyleneimine.

In the manner given in Example 1, other alkyl 2-oxocycloalkanecarboxylates can be reacted with heterocyclic amines, such as pyrrolidine, piperidine, 2-, 3- and 4-methylpiperidine, hexamethyleneimine, morpholine, N-methylpiperazine or the like to give the corresponding 2-oxocycloalkanecarboxamide (II). These compounds II can be treated with secondary amines and hydrogenated with a catalyst to give cis - N - [(2 - aminocycloalkyl)carbonyl] amines (IV). Representative compounds (IV), thus obtained, include:

cis-4-[[2-(4-methylpiperazino)cyclohexyl]carbonyl]-morpholine;
cis-1-[(2-dihexylaminocyclohexyl)carbonyl]-4-methylpiperazine;
cis-1-[(2-dipentylaminocyclohexyl)carbonyl]pyrrolidine;
cis-1-[(2-diisopropylaminocyclohexyl)carbonyl]-piperidine;
cis-1-[(2-methylpentylaminocyclohexyl)carbonyl]hexamethyleneimine;
cis-4-[(2-dibutylaminocyclopentyl)carbonyl]morpholine;
cis-1-[(2-diethylaminocyclopentyl)carbonyl]-4-methylpiperazine;
cis-1-[(2-dimethylaminocyclopentyl)carbonyl]-4-methylpiperidine;
cis-1-[[2-(2-methylpiperidino)cyclopentyl]carbonyl]-4-methylpiperazine;
cis-1-[(2-hexamethyleneiminocyclopentyl)carbonyl]-4-methylpiperazine;
cis-1-[(2-diisobutylaminocycloheptyl)carbonyl]-3-methylpiperidine;
cis-4-[(2-dipropylaminocycloheptyl)carbonyl]morpholine;
cis-1-[(2-dimethylaminocycloheptyl)carbonyl]-4-methylpiperazine;
cis-1-[[2-(3-methylpiperidino)cycloheptyl]carbonyl]-4-methylpiperazine;
cis-1-[(2-pyrrolidinocycloheptyl)carbonyl]-4-methylpiperidine;

and the like.

EXAMPLE 27

Cis-N-cyclohexyl-2-piperidinocyclohexanecarboxamide and its hydrochloride

A solution of 42 g. (0.33 mole) of cyclohexyl isocyanate in dry benzene (200 ml.) was added dropwise to a stirred, refluxing solution of 1-piperidino-1-cyclohexene (55 g.; 0.33 mole) in benzene (200 ml.). The solution was refluxed for 17 hours and the solvent was removed on a rotary evaporator. The residue was dissolved in thiophene-free benzene (400 ml.) and hydrogenated for 3½ hours in the presence of platinum catalyst (1.0 g. $PtO_2$) at an initial pressure of 50 p.s.i. The catalyst was removed by filtration and the filtrate was extracted with dilute hydrochloric acid (two 300-ml. portions). The combined extracts were made basic with aqueous sodium hydroxide solution and then extracted with methylene chloride (three 250-ml. portions). The combined extracts were made basic with aqueous sodium hydroxide solution and then extracted with methylene chloride (three 250-ml. portions). The combined organic extracts were washed with water (100 ml.) and dried over anhydrous magnesium sulfate. The solvent was removed on a rotary evaporator and the residue was recrystallized from hexane to give 64 g. (66%) of cis-N-cyclohexyl-2-piperidinocyclohexanecarboxamide.

A 30-g. portion of this base was converted into the hydrochloride in ether and recrystallized from ethanol-ether to yield 24 g. of cis-N-cyclohexyl-2-piperidinocyclohexanecarboxamide hydrochloride of melting point 229–230° C.

Analysis.—Calcd. for $C_{18}H_{32}N_2O \cdot HCl$ (percent): C, 65.71; H, 10.10; N, 8.52; Cl, 10.80. Found (percent): C, 65.66; H, 9.97; N, 8.64; Cl, 10.95.

EXAMPLE 28

Cis-N-butyl-2-piperidinocyclohexanecarboxamide

In the manner given in Example 27, butyl isocyanate and 1-piperidino-1-cyclohexene were heated together and the resulting product was hydrogenated in the presence of a platinum catalyst to give cis-N-butyl-2-piperidinocyclohexanecarboxamide.

EXAMPLE 29

Cis-N-hexyl-2-morpholinocyclohexanecarboxamide

In the manner given in Example 27, hexyl isocyanate and 1-morpholino-1-cyclohexene were heated together and the resulting product was hydrogenated in the presence of a platinum catalyst to give cis-N-hexyl-2-morpholinocyclohexanecarboxamide.

EXAMPLE 30

Cis-N-cyclopentyl-2-hexamethyleneiminocyclopentane-carboxamide

In the manner given in Example 27, cyclopentyl isocyanate and 1-hexamethyleneimino-1-cyclopentene were heated together and the resulting product was hydrogenated in the presence of a platinum catalyst to give cis-N-cyclopentyl - 2 - hexamethyleneiminocyclopentanecarboxamide.

EXAMPLE 31

Cis-N-isobutyl-2-(4-methylpiperazino)cycloheptane-carboxamide

In the manner given in Example 27, isobutyl isocyanate and 1-(4-methylpiperazino)-1-cycloheptene were heated together and the resulting product was hydrogenated in the presence of a platinum catalyst to give cis-N-isobutyl-2-(4-methylpiperazino)cycloheptanecarboxamide.

EXAMPLE 32

Cis-N-cycloheptyl-2-pyrrolidinocyclohexane-carboxamide

In the manner given in Example 27, cycloheptyl isocyanate and 1-pyrrolidino-1-cyclohexene were heated together and the resulting product was hydrogenated in the presence of a platinum catalyst to give cis-N-cycloheptyl-2-pyrrolidinocyclohexanecarboxamide.

In the manner given in Example 27, other products of Formula XI in which $R_1$ is hydrogen can be produced by reacting an enamine VIII with an isocyanate of formula $O=C=N-R_2$ and catalytically hydrogenating the product. Representative compounds, thus obtained, include:

cis-N-methyl-2-piperidinocyclohexanecarboxamide;
cis-N-ethyl-2-pyrrolidinocyclopentanecarboxamide;
cis-N-isopropyl-2-pyrrolidinocyclopentanecarboxamide;
cis-N-butyl-2-morpholinocycloheptanecarboxamide;
cis-N-isobutyl-2-(4-methylpiperazino)cycloheptane-carboxamide;
cis-N-pentyl-2-(4-methylpiperazino)cyclohexane-carboxamide;
cis-N-propyl-2-hexamethyleneiminocyclopentane-carboxamide;
cis-N-hexyl-(2-methylpiperidino)cycloheptane-carboxamide;
cis-N-cyclopentyl-2-(3-methylpiperidino)cycloheptane-carboxamide;
cis-N-(2,2-dimethylbutyl)-2-pyrrolidinocyclo-heptanecarboxamide;

and the like.

EXAMPLE 33

Trans-N-cyclohexyl-2-piperidinocyclohexane carboxamide

A solution of cis-N-cyclohexyl-2-piperidinocyclohexanecarboxamide (0.35 mole), potassium tert butoxide (0.04 mole) and 125 ml. of tert.butyl alcohol was refluxed for 24 hours. The mixture was cooled, diluted with 500 ml. of water and extracted with three 200-ml. portions of methylene chloride. The combined extracts were washed with 100 ml. of water, dried over anhydrous magnesium sulfate and evaporated (on a rotary evaporator) to give a residue. This residue was recrystallized from hexane to give trans-N-cyclohexyl-2-piperidinocyclohexanecarboxamide.

In the same manner given in Example 33, other cis-compounds of Formula XI are converted to trans compounds by treatment with potassium tert.butoxide. Representative compounds, thus prepared, include:

trans-1-[(2-piperidinocyclohexyl)carbonyl]piperidine;
trans-1-[[(2-morpholino)cyclohexyl]carbonyl] piperidine;
trans-1-[[2-(1-pyrrolidinyl)cyclohexyl]carbonyl] piperidine;
trans-4-[(2-morpholinocyclohexyl)carbonyl] morpholine;
trans-4-[[2-(1-pyrrolidinyl)cyclohexyl]carbonyl] morpholine;
trans-4-[(2-piperidinocyclohexyl)carbonyl] morpholine;
trans-1-[(2-hexamethyleneiminocyclohexyl)carbonyl] hexamethylene-imine;
trans-1-[[2-(1-pyrrolidinyl)cyclohexyl]carbonyl] pyrrolidine;
trans-N-[(2-piperidinocyclohexyl)carbonyl] diethylamine;
trans-1-[(2-piperidinocyclopentyl)carbonyl] piperidine;
trans-1-[[2-(1-pyrrolidinyl)cyclopentyl]carbonyl] pyrrolidine;
trans-N-methyl-2-piperidinocyclohexanecarboxamide;
trans-N-ethyl-2-pyrrolidinocyclopentanecarboxamide;
trans-N-(2,2-dimethylbutyl)-2-pyrrolidinocycloheptane-carboxamide;

and the like.

EXAMPLE 34

Cis-1-[2-[(cyclohexylamino)methyl]cyclohexyl] piperidine and its dihydrochloride A solution of cis-N-cyclohexyl-2-piperidinocyclohexanecarboxamide (8.0 g.; 0.0274 mole) in dioxane (200 ml.) was added dropwise to a stirred suspension of lithium aluminum hydride (8.0 g.) in dioxane (300 ml.). After the addition was completed the mixture was heated on a steam-bath with stirring for 16 hours. The mixture was cooled (<10° C.) and treated dropwise with the following: (1) water (8 ml.); (2) 15% aqueous sodium hydroxide solution (8 ml.); (3) water (24 ml.). The precipitate was removed by filtration and washed with dioxane. The filtrate was dried over anhydrous magnesium sulfate and the solvent was removed on a rotary evaporator. The residue was converted into the dihydrochloride in ether and recrystallized from absolute ethanol (800 ml.) to give 6.1 g. (65%) of cis-1-[2-[(cyclohexylamino)methyl]cyclohexyl]piperidine dihydrochloride of melting point 321–322° C.

*Analysis.*—Calcd. for $C_{18}H_{34}N_2 \cdot 2HCl$ (percent): C, 61.49; H, 10.33; N, 7.93; Cl, 20.21. Found (percent): C, 61.04; H, 10.35; N, 7.73; Cl, 19.98.

The dihydrochloride in water solution was treated with aqueous sodium hydroxide, the mixture extracted with methylene chloride and the methylene chloride solution evaporated to give the free base, cis-1-[2-[(cyclohexylamino)methyl]cyclohexyl]piperidine.

EXAMPLE 35

Cis-1-[2-(piperidinomethyl)cyclohexyl]piperidine dihydrochloride

A solution of cis-1-[(2-piperidinocyclohexyl)carbonyl]piperidine (1.1 g.; 0.040 mole) in anhydrous ether (150 ml.) was added dropwise to a cooled suspension of lithium aluminum hydride (6.7 g.; 0.176 mole) in ether (300 ml.). The solution was stirred for 20 hours at room temperature, cooled, and treated dropwise with the following: (1) water (14 ml.); (2) 20% aqueous sodium carbonate solution (5.0 ml.); (3) water (24 ml.). The resulting precipitate was removed by filtration and washed several times with ether. The combined organic portions were washed with water (50 ml.) and dried over anhydrous magnesium sulfate. The solvent was removed on a rotary evaporator. The residue was submitted to partial vacuum distillation (bath 120° C. at 0.1 mm.) to remove the lower boiling impurities. The dihydrochloride of the pot residue was prepared in ether with ethereal hydrogen chloride and recrystallized from ethanol-ether to give 3.0 g. of hydrated cis-1-[2-(piperidinomethyl)cyclohexyl]piperidine dihydrochloride of melting point 229–230.5° C.

*Analysis.*—Calcd. for $C_{17}H_{32}N_2 \cdot 2HCl \cdot 2/3 H_2O$ (percent): C, 58.40; H, 10.11; N, 8.01; Cl, 20.33. Found (percent): C, 58.24; H, 10.22; N, 7.92; Cl, 20.10.

Heating the hydrate for 72 hours at 10 mm. Hg pressure in a dessicator, gave the water-free cis-1-[2-piperidinomethyl)cyclohexyl]piperidine dihydrochloride.

EXAMPLE 36

Cis-1-[2-(piperidinomethyl)cyclopentyl]piperidine and its dihydrochloride

A solution of cis-1-[(2-piperidinocyclopentyl)carbonyl]piperidine (8.5 g.; 0.032 mole) in anhydrous ether (125 ml.) was added dropwise to a cooled suspension of lithium aluminum hydride (6.7 g.; 0.176 mole) in ether (300 ml.). The solution was stirred for 18 hours at room temperature, cooled, and treated dropwise with (1) water (14 ml.); (2) 20% aqueous sodium carbonate solution (5.0 ml.); (3) water (24 ml.). The precipitate was removed by filtration and washed with ether (two 100-ml. portions). The combined organic portions were washed with water (50 ml.) and dried over anhydrous magnesium sulfate. The solvent was removed on a rotary evaporator to give cis-1[2 - (piperidinomethyl)cyclopentyl]piperidine as a colorless oil. The dihydrochloride was prepared in ether with etheral hydrogen chloride and recrystallized from ethanol-ether to give 10 g. (94%) of cis-1-[2 - (piperidinomethyl)cyclopentyl]piperidine dihydrochloride of melting point 264.5–265.5° C.

*Analysis.*—Calcd. for $C_{16}H_{30}N_2 \cdot 2HCl$ (percent): C, 59.42; H, 9.97; N, 8.68; Cl, 21.92. Found (percent): C, 59.16; H, 10.00; N, 8.36; Cl, 21.75.

EXAMPLE 37

Cis-1-[2-(morpholinomethyl)cyclohexyl]piperidine dihydrochloride

In the manner given in Example 34, cis-1-[(2-morpholinocyclohexyl)carbonyl]piperidine was reduced with lithium aluminum hydride and the resulting product reacted with an ethereal solution of hydrogen chloride to give cis-1 - [2-(morpholinomethyl)cyclohexyl]piperidine dihydrochloride.

EXAMPLE 38

Cis-1-[2-[(1-pyrrolidinyl)methyl]cyclohexyl]piperidine dihydrochloride

In the manner given in Example 34, cis-[[2-(1-pyrrolidinyl)cyclohexyl]carbonyl]piperidine was reduced with lithium aluminum hydride and the resulting product reacted with an ethereal solution of hydrogen chloride to give cis-1 - [2 - [(1-pyrrolidinyl)methyl]cyclohexyl]piperidine dihydrochloride.

EXAMPLE 39

Cis-4-[2-(morpholinomethyl)cycloxyl]morpholine dihydrochloride

In the manner given in Example 34, cis-4-[(2-morpholinocyclohexyl)carbonyl]morpholine was reduced with lithium aluminum hydride and the resulting product reacted with an ethereal solution of hydrogen chloride to give cis-4-[2-(morpholinomethyl)cyclohexyl]morpholine dihydrochloride.

EXAMPLE 40

Cis-1-[2-(hexamethyleneiminomethyl)cyclohexyl]hexamethyleneimine dihydrochloride In the manner given in Example 34, cis-1-[(2-hexamethyleneiminocyclohexyl) carbonyl] hexamethyleneimine was reduced with lithium aluminum hydride and the resulting product reacted with an ethereal solution of hydrogen chloride to give cis-1 - [2-(hexamethyleneiminomethyl)cyclohexyl]hexamethyleneimine dihydrochloride.

EXAMPLE 41

Cis-1-[2-[(1-pyrrolidinyl)methyl]cyclohexyl]pyrrolidine dihydrochloride

In the manner given in Example 34, cis-1-[[2-(1-pyrrolidinyl)cyclohexyl]carbonyl]pyrrolidine was reduced with lithium aluminum hydride and the resulting product reacted with an ethereal solution of hydrogen chloride to give cis-1-[2-[(1-pyrrolidinyl)methyl]cyclohexyl]pyrrolidine dihydrochloride.

EXAMPLE 42

Trans-1-[2-[(cyclohexylamino)methyl]cyclohexyl]piperidine dihydrochloride

In the manner given in Example 34, trans-N-cyclohexyl-2-piperidinocyclohexanecarboxamide was reduced with lithium aluminum hydride and the resulting product reacted with an ethereal solution of hydrogen chloride to give trans-1 - [2-[(cyclohexylamino)methyl]cyclohexyl]piperidine dihydrochloride.

In the manner given in Example 34, other aminoamides of Formula XI can be reduced with a metal hydride and the reduced product can be treated with hydrogen chloride to give the corresponding diamine polyhydrochlorides of the compounds of Formula XII. Representative compounds, thus obtained, include:

cis-1-[2-(morpholinomethyl)cycloheptyl]piperidine dihydrochloride;
cis-1-[2-[(diethylamino)methyl]cyclohexyl]piperidine dihydrochloride;
cis-1-[2-(piperidinomethyl)cyclopentyl]piperidine dihydrochloride;
cis-1-[2-(piperidinomethyl)cycloheptyl]piperidine dihydrochloride;
cis-1-[2-(morpholinomethyl)cycloheptyl]hexamethylenemine dihydrochloride;
cis-1-[2-(morpholinomethyl)cycloheptyl]-4-methylpiperazine trihydrochloride;
cis-1-[2-[(2-methylpiperidino)methyl]cyclohexyl]-3-methylpiperidine dihydrochloride;

cis-1-[2-[(dimethylamino)methyl]cyclopentyl]hexamethyleneimine dihydrochloride;
trans-1-[2-[(1-pyrrolidinyl)methyl]cyclohexyl]piperidine dihydrochloride;
trans-1-[2-(piperidinomethyl)cyclopentyl]piperidine dihydrochloride;
trans-1-[2-[(1-pyrrolidinyl)methyl]cyclohexyl]pyrrolidine dihydrchloride;
trans-1-[2-[(1-pyrrolidinyl)methyl]cyclopentyl]pyrrolidine dihydrochloride; and the like.

Treating the above hydrochlorides with aqueous sodium hydroxide, extracting with an organic solvent, e.g., ether, benzene, methylene chloride, chloroform or the like, and evaporating the solvent gives the free bases.

The free bases by treatment with stoichiometric amounts of other acids, e.g., hydrogen bromide, hydrogen iodide, sulfuric, chloric, perchloric, acetic, propionic, butyric, trichloroacetic, benzoic, phenylacetic, 3-phenylpropionic, benzenesulfonic, p-toluenesulfonic, methanesulfonic, cyclohexanesulfamic, lactic, citric, maleic, malic, tartaric acids or the like provides other salts of the compounds of Formula XII.

What is claimed is:
1. A compound of the formula

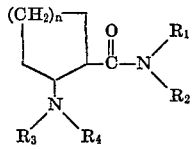

wherein $n$ is a number of 1 to 3 inclusive; wherein

is selected from the group consisting of dialkylamino in which the alkyl group is of 1 to 6 carbon atoms, inclusive, pyrrolidino, piperidino, methylpiperidino, and hexamethyleneimino, and wherein

is selected from the group consisting of pyrrolidino, piperidino, and methylpiperidino, and hexamethyleneimino.

2. A cis compound according to claim 1 wherein

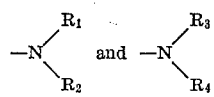

are piperidino and the compound is therefore cis-1-[(2-piperidinocyclohexyl)carbonyl]piperidine.

3. The hydrochloride of the compound of claim 2, namely cis-1 - [2-piperidinocyclohexyl)carbonyl]piperidine hydrochloride.

4. A cis compound according to claim 1 as a hydrochloride, wherein $R_1$ and $R_2$ are ethyl and

is piperidino and the compound is therefore cis-N-[(2-piperidinocyclohexyl)carbonyl]diethylamine hydrochloride.

5. A cis compound according to claim 1 of Formula XI, wherein $n$ is 1,

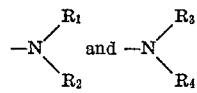

are piperidino and the compound is therefore cis-1-[(2-piperidinocyclopentyl)carbonyl]piperidine.

References Cited
UNITED STATES PATENTS
3,510,492   5/1970   Szmuszkovicz _____ 260—293

OTHER REFERENCES
Wilder Smith et al., Helv. Chim. Acta 38, 1085–95 (1955).

HENRY R. JILES, Primary Examiner

G. T. TODD, Assistant Examiner

U.S. Cl. X.R.

260—239 B, 239 BF, 247.2 A, 247.5 R, 247.7 H, 268 R, 268 C, 268 H, 293.52, 293.65, 293.69, 293.71, 326.3, 326.5 E, 326.81, 326.85, 468 R, 557 R, 563 R; 424—248, 250, 267, 274, 320, 325

UNITED STATES PATENT OFFICE
CERTIFICATE OF CORRECTION

Patent No. 3,647,804              Dated March 7, 1972

Inventor(s) Ronald H. Rynbrandt and Louis L. Skaletzky

It is certified that error appears in the above-identified patent and that said Letters Patent are hereby corrected as shown below:

Column 4, line 42, for "100 mg.kg.)" read -- 100 mg./kg.) --. Column 5, line 56, for "compositions" read -- composition --; line 62, for "resortable" read -- resorbable --. Column 6, line 54, for "as crystallization" read -- as by crystallization --. Column 7, line 1, for "IV and V" read -- IV or V --. Column 9, line 3, for "oxocyclohexy" read -- oxocyclohexyl --; line 25, for "morpholinocyclohexy" read -- morpholinocyclohexyl --; line 46, for "-4-[2-" read -- -4-[(2- --; line 46, for "morpholincyclohexy" read -- morpholinocyclohexyl --. Column 11, line 66, for "$C_{15}H_{26}N_2O \cdot HCl$:" read -- $C_{15}H_{26}N_2O \cdot HCl$: --. Column 16, line 5, for "hexyl-(2-" read -- hexyl-2-(2- --. Column 17, line 17, for "(1.1 g.;" read -- (11.1 g.; --; line 40, for "cis-1-[2-" read -- cis-1-[2-( --. Column 29, line 11, for "cis-1-[2-" read -- cis-1-[(2- --.

Signed and sealed this 25th day of July 1972.

(SEAL)
Attest:

EDWARD M. FLETCHER, JR.          ROBERT GOTTSCHALK
Attesting Officer                Commissioner of Patents